(12) United States Patent
Lee

(10) Patent No.: US 9,774,383 B1
(45) Date of Patent: Sep. 26, 2017

(54) WIRELESS RELAY ANTI-INTERFERENCE SYSTEM AND METHOD

(71) Applicants: NANNING FUGUI PRECISION INDUSTRIAL CO., LTD., Nanning (CN); HON HAI PRECISION INDUSTRY CO., LTD., New Taipei (TW)

(72) Inventor: Yang-Han Lee, New Taipei (TW)

(73) Assignees: NANNING FUGUI PRECISION INDUSTRIAL CO., LTD., Nanning (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/403,268

(22) Filed: Jan. 11, 2017

(30) Foreign Application Priority Data

Dec. 23, 2016 (CN) .......................... 2016 1 1208194

(51) Int. Cl.
*H04B 7/155* (2006.01)
*H04B 17/318* (2015.01)
*H04B 17/336* (2015.01)

(52) U.S. Cl.
CPC ....... *H04B 7/15585* (2013.01); *H04B 17/318* (2015.01); *H04B 17/336* (2015.01)

(58) Field of Classification Search
CPC ........ H04B 7/15585; H04B 2203/5479; H04B 7/15542
USPC ....... 455/10, 11.1, 7, 13.1, 15, 16, 443, 436, 455/446, 447, 67.11, 63.1, 422.1, 403, 455/445, 426.1, 426.2, 423–425, 522, 69; 370/315, 310, 316, 317
See application file for complete search history.

(56) References Cited

U.S. PATENT DOCUMENTS

2015/0065160 A1* 3/2015 Meredith .............. H04W 64/00
455/456.1

* cited by examiner

*Primary Examiner* — Keith Ferguson
(74) *Attorney, Agent, or Firm* — Steven Reiss

(57) ABSTRACT

A wireless relay anti-interference system includes a detecting module, a determining module, and a processing module. The detecting module detects a first received signal strength indication (RSSI), and a first carrier to interference noise ratio (CINR) of a first user. The determining module receives the first RSSI, the first CINR, and a first ratio between the first RSSI and the first CINR of first user, and determines whether the first user is entering a region of signal overlap. The method and system of the disclosure can avoid signal interference and improve the efficiency of the system.

10 Claims, 3 Drawing Sheets

WIRELESS RELAY ANTI-INTERFERENCE SYSTEM AND METHOD

FIELD

The subject matter herein generally relates to wireless relay anti-interference systems and methods.

BACKGROUND

In wireless communication, multiple wireless repeaters usually operate between a base station and a mobile phone to expand signal coverage. However, since the same frequency is used to carry signals between multiple wireless repeaters and the base station, carrier interference between the repeaters arises, which greatly reduces the efficiency of the system.

BRIEF DESCRIPTION OF THE DRAWINGS

Implementations of the present disclosure will now be described, by way of example only, with reference to the attached figures.

DETAILED DESCRIPTION

Figure 1:
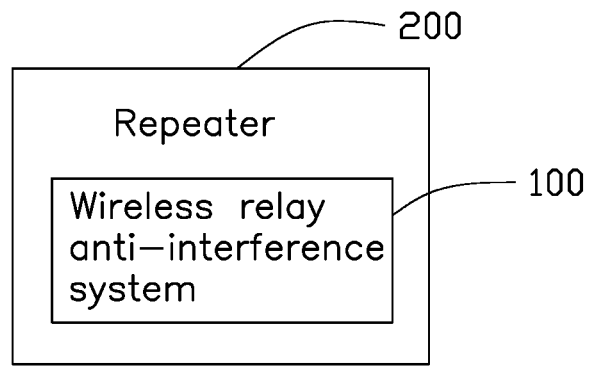
FIG. 1 is a schematic diagram of an exemplary embodiment of a repeater with an exemplary wireless relay anti-interference system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

Figure 2:
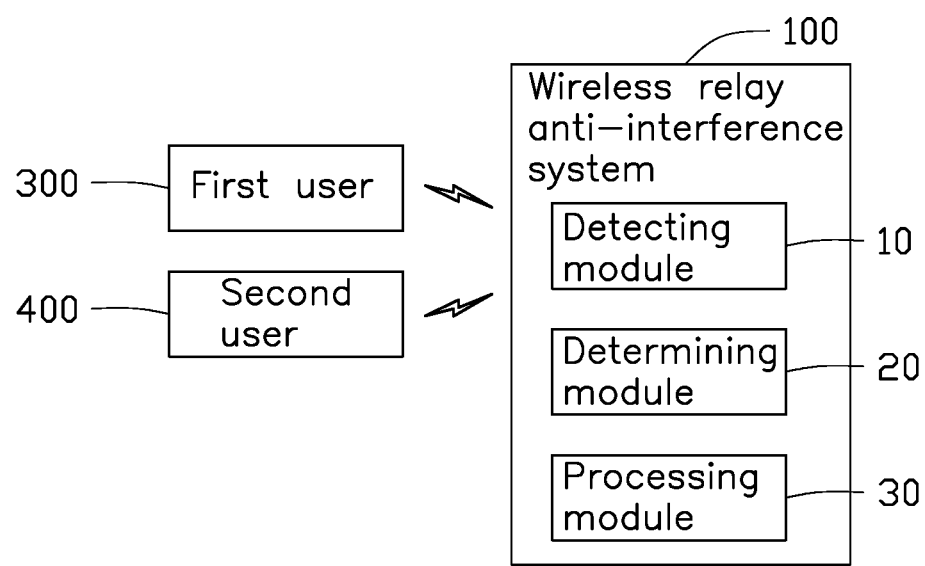
FIG. 2 is a schematic diagram of an exemplary embodiment of the wireless relay anti-interference system.

FIG. 1 illustrates an exemplary embodiment of a repeater 200 comprising a wireless relay anti-interference system 100 of the present disclosure. FIG. 2 illustrates an exemplary embodiment of the wireless relay anti-interference system 100 of the present disclosure.

The wireless relay anti-interference system 100 comprises a detecting module 10, a determining module 20, and a processing module 30.

The detecting module 10, the determining module 20, and the processing module 30 of the wireless relay anti-interference system 100 communicate with multiple repeaters 200. Each repeater 200 is responsible for forwarding data and covering a network area.

The detecting module 10 detects a first received signal strength indication (RSSI) of a first user 300, a first carrier to interference noise ratio (CINR) of the first user 300, and a first ratio value between the first RSSI and the first CINR. The detecting module 10 transmits the first RSSI, the first CINR, and the first ratio value to the determining module 20.

The determining module 20 receives the first RSSI, the CINR, and the first ratio value, and then determines whether the first user 300 is entering a region of signal overlap.

When the first RSSI of the first user 300 becomes larger, and the first CINR of the first user 300 becomes smaller, the formula is as follows:

$$CINR < \{CINR_1, CINR_2, \ldots CINR_n\} \text{ if } RSSI > \{RSSI_1, RSSI_2 \ldots RSSI_R\} \quad \text{Formula (1):}$$

$$\sum_{x: the\ xth\ frame}^{n} \left(\frac{CINR_{min}}{RSSI}\right)_x > \sum_{n: the\ nth\ frame}^{n+k} \left(\frac{CINR_{min}}{RSSI}\right)_n \quad \text{Formula (2)}$$

The determining module 20 further compares the first ratio value of the first user 300 with at least one second user 400 in the area of one repeater 200. When the first ratio value of the first user 300 is greater than the second user 400, the determining module 20 determines that the first user 300 is entering the region of signal overlap and the formula (2) is applied.

The determining module 20 further determines whether a carrier power of the first user 300 is greater than an average value of the carrier power of all the repeaters. The formula is as follows:

$$\frac{\sum_{x: the\ xth\ PIFS/SIFS}^{n} \text{Peak Power}_x >}{\sum_{i,j,k\ldots}^{n} \{R_i + [R_i + R_j] + [R_i + R_j + R_k] + \ldots [R_i + R_j + R_k + \ldots + R_n]\}} \quad (3)$$

Interference is determined for the first user 300 when the carrier power of the first user 300 is greater than the average value of the carrier power of all repeaters.

The processing module 30 issues a preamble signal to perform a withdraw action to disengage the first user 300 from the interference.

The determining module 20 further determines whether the first user 300 is disengaged from the interference. When the first user 300 is not disengaged from the interference, the processing module 30 cancels the withdraw action.

When the first user 300 is disengaged from the interference, the determining module 20 further determines whether the carrier power of the first user 300 is less than the average value of the carrier power of all repeaters. When the carrier power of the first user 300 is less than the average value of the carrier power of all repeaters, the processing module 30 cancels the withdraw action. When the carrier power of the first user 300 is greater than or equal to the average value of the carrier power of all repeaters, the processing module 30 continues to issue the preamble signal to perform the withdraw action.

Figure 3:
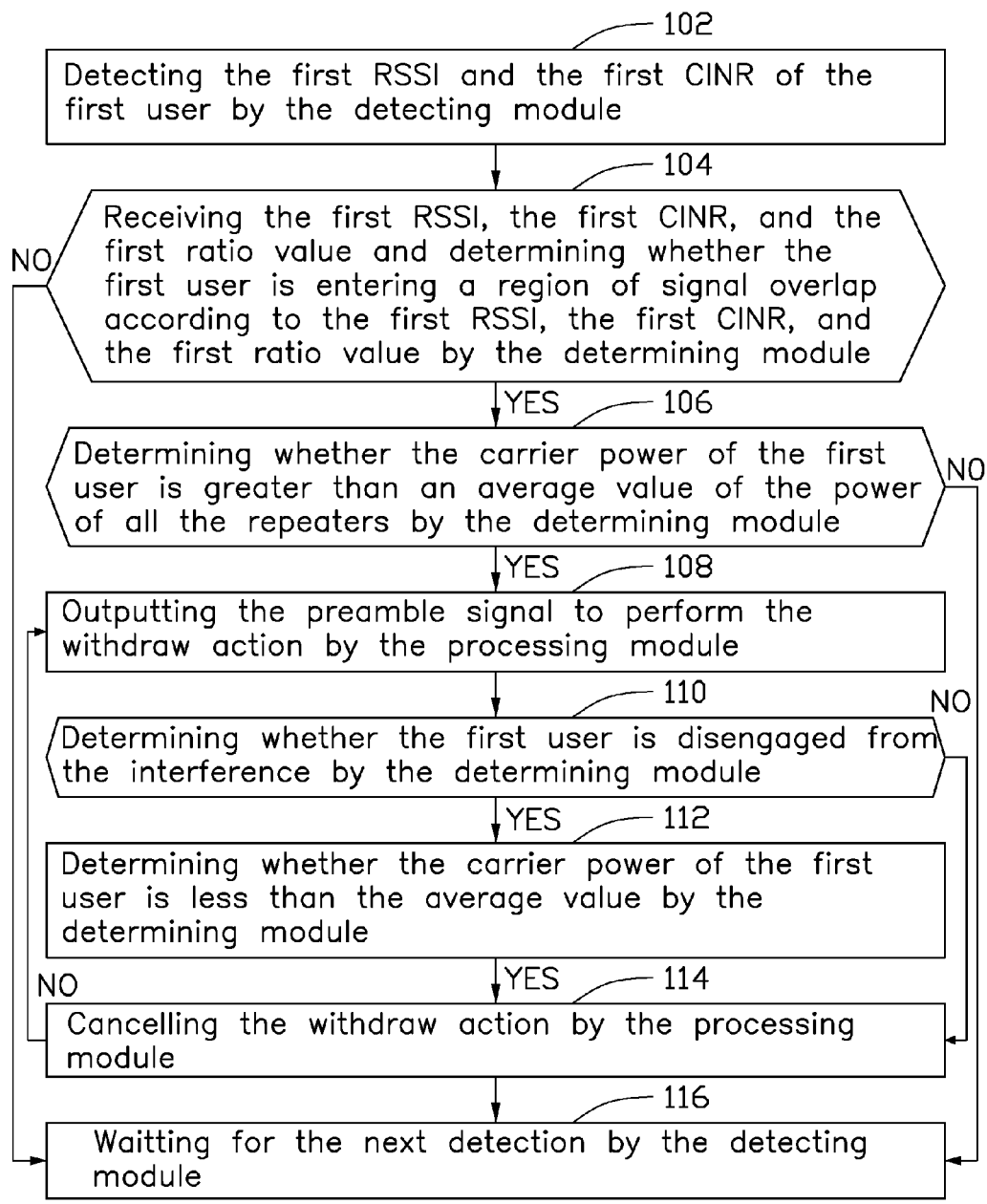
FIG. 3 is a flowchart of an exemplary embodiment of a wireless relay anti-interference method.

FIG. 3 illustrates a flowchart diagram of an exemplary embodiment of a wireless relay anti-interference method of the present disclosure. A flowchart is presented in accordance with an example embodiment which is being thus illustrated. The example method is provided by way of example, as there are a variety of ways to carry out the method. The method described below can be carried out using the configurations illustrated in FIG. 1, for example, and various elements of these figures are referenced in explaining example method. Blocks shown in FIG. 3 represent one or more processes, methods, or subroutines, carried out in the test method. Furthermore, the illustrated order of blocks is by example only and the order of the blocks can change. Additional blocks may be added or fewer blocks may be utilized, without departing from this disclosure. The method can begin at block 102.

At block 102, the detecting module 10 detects the first RSSI and the first CINR of the first user 300, and transmits the first RSSI and the first CINR of the first user 300 to the determining module 20.

At block 104, the determining module 20 receives the first RSSI and the first CINR of the first user 300, and then determines whether the first user 300 is entering the region of signal overlap according to the first RSSI, the CINR, and the first ratio value. If the first user 300 is entering the region of signal overlap, block 106 is implemented, otherwise the block 116 is implemented.

When the first RSSI of the first user 300 becomes larger and the first CINR of the first user 300 becomes smaller, the determining module 20 further compares the first ratio value of the first user 300 with at least one second user 400 in the area of one repeater 200.

When the first ratio value of the first user 300 is greater than the second user 400, the determining module 20 determines the first user 300 is entering the signal overlap region.

At block 106, the determining module 20 determines whether the carrier power of the first user 300 is greater than the average value of the carrier power of all repeaters. If the carrier power of the first user 300 is greater than the average value of the carrier power of all repeaters, block 108 is implemented, and otherwise the block 116 is implemented.

In the illustrated embodiment, interference is determined for the first user 300 when the carrier power of the first user 300 is greater than the average value of the carrier power of all repeaters.

At block 108, the processing module 30 issues the preamble signal to perform the withdraw action to disengage the first user 300 from the interference.

At block 110, the determining module 20 determines whether the first user 300 is disengaged from the interference. If the first user 300 is disengaged from the interference, block 112 is implemented, and otherwise the block 114 is implemented.

At block 112, the determining module 20 determines whether the carrier power of the first user 300 is less than the average value of the carrier power of all repeaters. If the carrier power of the first user 300 is less than the average value of the carrier power of all repeaters, the block 114 is implemented, and otherwise the process returns to the block 108.

At block 114, the processing module 30 cancels the withdraw action.

At block 116, the detecting module waits for the next detection.

The embodiments shown and described above are only examples. Many details are often found in the art such as the other features of wireless relay anti-interference system and method. Therefore, many such details are neither shown nor described. Even though numerous characteristics and advantages of the present disclosure have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A wireless relay anti-interference method comprising:
   detecting a first received signal strength indication (RSSI), a first carrier to interference noise ratio (CINR), and a first ratio value between the first RSSI and the first CINR of a first user by a detecting module;
   determining whether the first user is entering a region of signal overlap according to the first RSSI, the first CINR, and the first ratio value by a determining module;
   determining whether a carrier power of the first user is greater than an average value of the power of all the repeaters by the determining module when the first user is entering the region of signal overlap; and
   outputting a preamble signal to perform a withdraw action by a processing module when the carrier power of the first user is greater than the average value of the carrier power of all repeaters; wherein the processing module performs the withdraw action to disengage the first user from the interference.

2. The wireless relay anti-interference method of claim 1, further comprising:
   determining the first user is entering the region of signal overlap by the determining module when the first ratio value is greater than at least one second user.

3. The wireless relay anti-interference method of claim 2, further comprising:
   determining whether the first user is disengaged from the interference; and
   cancelling the withdraw action by the processing module when the first user is not disengaged from the interference.

4. The wireless relay anti-interference method of claim 3, further comprising:
   determining whether the carrier power of the first user is less than the average value of the carrier power of all repeaters by the determining module when the first user is disengaged from the interference; and
   cancelling the withdraw action by the processing module when the carrier power of the first user is less than the average value of the carrier power of all repeaters.

5. The wireless relay anti-interference method of claim 4, further comprising:
   outputting the preamble signal to perform the withdraw action by the processing module when the carrier power is greater than or equal to the average value of the carrier power of all repeaters.

6. A wireless relay anti-interference system comprising:
   a detecting module, configured for detecting a first received signal strength indication (RSSI), a first carrier to interference noise ratio (CINR), and a first ratio value between the first RSSI and the first CINR of a first user;
a determining module, configured for receiving the first RSSI, the first CINR, and the first ratio value from the detecting module, and determining whether the first user is entering a region of signal overlap; wherein when the first user enters the region of signal overlap, the determining module further determines whether a carrier power of the first user is greater than an average value of the power of all the repeaters; and
a processing module, configured for outputting a preamble signal to perform a withdraw action; wherein when the carrier power of the first user is greater than the average value, the processing module performs the withdraw action to disengage the first user from the interference.

7. The wireless relay anti-interference system of claim 6, wherein the determining module determines the first user is entering the region of signal overlap when the first ratio value is greater than at least one second user.

8. The wireless relay anti-interference system of claim 7, wherein the determining module determines whether the first user is disengaged from the interference, and the processing module cancels the withdraw action when the first user is not disengaged from the interference.

9. The wireless relay anti-interference system of claim 8, wherein, when the first user is disengaged from the interference, the determining module further determines whether the carrier power of the first user is less than the average value of the carrier power of all repeaters, and, when the carrier power of the first user is less than the average value of the carrier power of all repeaters, the processing module cancels the withdraw action.

10. The wireless relay anti-interference system of claim 9, wherein when the carrier power is greater than or equal to the average value of the carrier power of all repeaters, the processing module continues to issue the preamble signal to perform the withdraw action to disengage the first user from the interference.

* * * * *